Patented June 10, 1952

2,599,737

UNITED STATES PATENT OFFICE 2,599,737

NITROGEN-CONTAINING ORGANIC COMPOUNDS AND THEIR PREPARATION

David E. Adelson, Berkeley, Calif., assignor to Shell Development Company, San Francisco, Calif., a corporation of Delaware No Drawing. Application July 8, 1949,
Serial No. 103,735

19 Claims. (Cl. 260—399)

This invention relates to valuable nitrogen-containing organic compounds and to a practical and economical process for their preparation. More particularly, the invention relates to nitrogen-containing esters and their production by the reaction of hydroxy compounds, most preferably alcohols, with derivatives of urea and thiourea. These esters as a class may be represented by the general formula

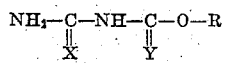

wherein X is a divalent radical of the group consisting of divalent oxygen, sulfur and imido (=NH) radicals, Y is a divalent oxygen or sulfur atom and R—O— is a monovalent radical derivable by removal of a hydrogen atom from a hydroxyl group of a hydroxy compound having 2 to 30 carbon atoms per molecule. The invention provides a commercially attractive process for the production of such nitrogen-containing esters and also deals with novel compounds of this type having especially advantageous properties.

The process of the invention is executed by reacting under reduced pressure a compound of the general formula

NH$_2$—C—NH—C—NH$_2$
‖       ‖
X       Y wherein X and Y represent the previously indicated radicals, i.e., biuret (also called carbamyl urea)

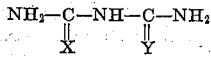

thiocarbamyl urea

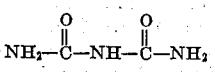

thiocarbamyl thiourea

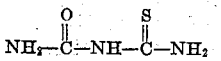

guanyl thiourea

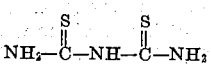

and guanyl urea

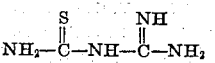

with a hydroxy compound which is free from substituents reactive under the reaction conditions and which does not polymerize under the reaction conditions employed. The fundamental reaction involved in the process of the invention whereby nitrogen-containing compounds, many of which are novel, are prepared may be represented as follows:

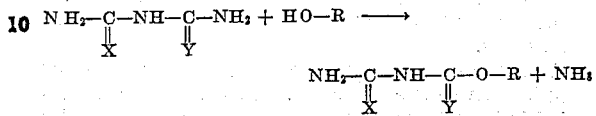

where R, X and Y represent the radicals previously indicated. From this equation it will be seen that the amino group of the starting urea or thiourea derivative which is substituted by the oxy radical (—O—R) of the hydroxy compound used in the reaction is the primary amino group attached to the carboxyl or thiocarboxyl group. The amino group attached to a carboxyl carbon atom has been found to be somewhat more reactive than one which is linked to a thiocarboxyl carbon atom, so in the case of thiocarbamyl urea a mixed product is obtained in which the carboxylic ester predominates over the thiocarboxylic ester. The process thus gives six closely related esters, namely:

allophanates or esters of allophanic acid

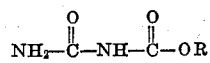

corresponding thioesters

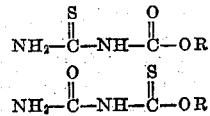

and

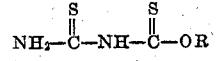

and the imido ester analogues of these esters

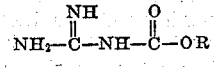

and

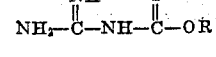

The equations for these reactions are:

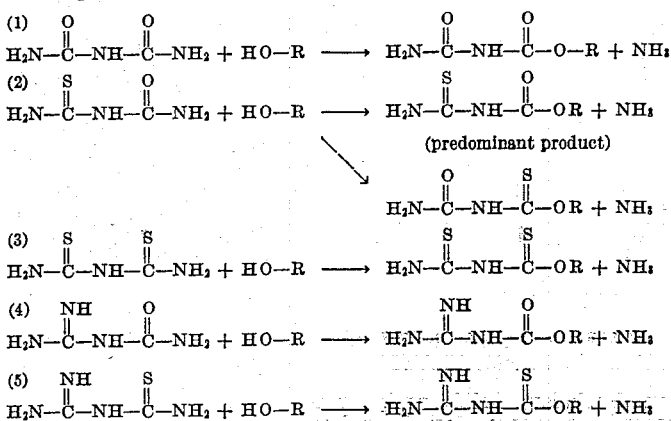

This process may be applied with particular effectiveness to the preparation of allophanates which have important commercial applications. Those which are oil soluble are particularly useful, for example, as addition agents in lubricating oils. When incorporated into a lubricating oil composition either singly or in admixture with each other, the allophanic acid esters markedly increase the resistance of the oil to break-down and sludge formation under severe oxidizing conditions, reduce the corrosion of the metal bearing surfaces with which the lubricating oils come in contact, and effect reduction of wear, scoring, seizing and scuffing of the bearing surfaces. Use of the esters also enables preparation of thin film lubricants that are very resistant to high pressures.

Numerous methods for preparing allophanates are known to the prior art. Certain of the esters of this type have been prepared, for example, by reacting an alcohol with biuret at superatmospheric pressure and in the presence of a condensing agent, e. g. hydrogen chloride:

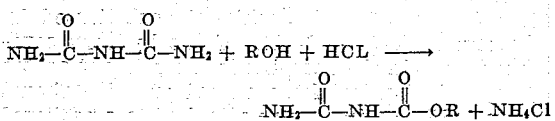

Allophanates have also been prepared by reacting an alcohol with carbamyl chloride in accordance with the equation:

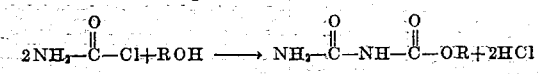

Ethyl allophanate has been made by reacting urethane with phosgene and ammonia:

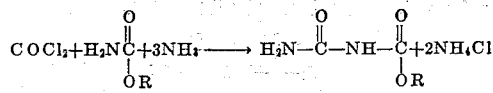

Allophanates have also been prepared by passing cyanic acid vapors into carbamates, by reacting thionyl chloride with urethane, by reacting ethyl carbamate with thionyl chloride, and by treating diethyl carbonate with sodium urea in the presence of acetone. These known procedures are limited in their application, however, and are, in general, characterized by the formation of low yields of allophanate product due primarily to the formation of a relatively large proportion of undesirable by-products. The raw materials used are in many instances not readily available. These methods of the prior art are therefore small scale methods not well suited to the technical scale production of esters of allophanic acid.

It has now been found that esters of allophanic acid and of the corresponding thio and imido-substituted acids may be prepared readily and economically, and in high yields, by the simple method, as stated hereinabove, of heating under reduced pressure, and preferably in the absence of a condensing agent, a compound of the general formula

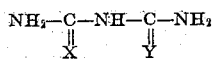

where X represents O, S or NH, and Y represents O or S, with an alcoholic hydroxy-substituted compound which does not polymerize or have substituents which react under the reaction conditions. Thus, in one embodiment, in which the process of the invention is applied to the preparation of esters of allophanic acid, esters of this type may be prepared by heating a mixture comprising an alcohol (ROH) and biuret

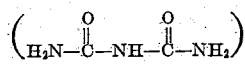

at subatmospheric pressure and at a temperature which is slightly below the boiling point of the alcohol at the particular pressure used. After the reaction is complete the reaction mixture may be cooled and the ester of allophanic acid separated therefrom.

Another embodiment of the invention is represented by the procedure which may be employed in the synthesis of hydroabietyl allophanate from biuret and hydroabietyl alcohol. In this case, a mixture comprising about two molar equivalents of hydroabietyl alcohol and about three molar equivalents of biuret may be placed in a suitable reaction vessel and heated with agitation at a temperature of from about 100° C. to about 200° C. and at a pressure which is below about 250 mm. of mercury. The gases leaving the reaction vessel may be drawn through a trap containing sulfuric acid in order to extract and recover the ammonia gas formed during the course of the reaction. After the reaction is complete, the reaction mixture may be cooled and then extracted with a suitable solvent, e. g. hot acid octanes (i. e. octanes prepared by the alkylation of isobutylene with isobutane in the presence of hot sulfuric acid) in order to separate the hydroabietyl allophanate from the unreacted starting materials, principally unreacted biuret, as well as from the by-products of the reaction. The solution of hydroabietyl allophanate in hot acid octanes may then be heated at atmospheric or subatmospheric pressures in order to evaporate the solvent and recover the hydroabietyl allophanate. In some cases it may be necessary or desirable to further purify the ester by dissolving it in a further quantity of hot solvent and precipitating it by cooling the solution with or without prior evaporation of part of the solvent.

The process of the present invention is applicable with suitable modifications to the preparation of a wide variety of allophanates and structurally related compounds, i. e. compounds of the general formula

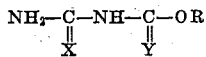

Hydroxy-substituted compounds which may be employed in the synthesis of esters in accordance with the presently disclosed process include the alcohols which may be aliphatic alcohols, aromatic or aralkyl alcohols and phenols, and alicyclic alcohols and substitution products thereof which are free from substituents which are reactive under the reaction conditions. As previously pointed out, alcohols having 2 to 30 carbon atoms per molecule are most generally used in the process. Primary, secondary or tertiary alcohols may be used and the alcohols may be saturated or unsaturated but preferably should not be so highly unsaturated as to polymerize excessively under the reaction conditions and interfere with the desired reaction. Mono-olefinic alcohols and polyolefinic alcohols in which the double bonds are unconjugated have been found to react satisfactorily without polymerization, and where a tendency to polymerize is encountered it can usually be suppressed by the use of conventional polymerization inhibitors in the reaction. Examples of suitable alcohols are, for instance, the aliphatic alcohols, particularly those having more than eight carbon atoms, cyclohexanol, the alkyl derivatives of cyclohexanol, the cresols, the xylenols, menthol, thymol, hydroabietyl alcohol, dimethyl-ethyl-n-propylhexahydrobenzyl alcohol, trimethylhexahydrobenzyl alcohol, beta(p-tertiary butyl phenoxy)ethyl alcohol, sulfurized oleyl alcohol, and the alcohols which are to be found in hydrogenated isophorone bottoms. The latter comprise the mixture of alcohols obtained by the catalytic hydrogenation under pressure of the high boiling compounds obtained as a by-product from the commercial production of isophorone by the reaction of acetone with strong aqueous caustic solutions. When acetone is reacted at elevated pressures and temperatures with strong sodium hydroxide or potassium hydroxide, a series of condensation and dehydration reactions occurs which leads primarily to the formation of isophorone

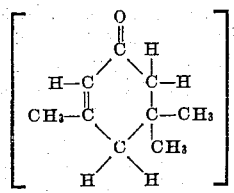

but also to the formation of higher boiling ketones which comprise the mixture known as isophorone bottoms. This mixture may be readily hydrogenated with hydrogen at elevated temperatures and pressures in the presence of a hydrogenation catalyst, such as nickel. The hydrogenated product, i. e. the hydrogenated isophorone bottoms, is a mixture of secondary alcohols corresponding in structure to the ketones in the original mixture. The alcohols have from nine to eighteen carbon atoms but predominate in $C_{12}$ to $C_{15}$ alcohols. Representative alcohols present in the mixture are, for example,

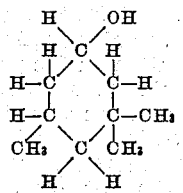

3,3,5-trimethylcyclohexanol

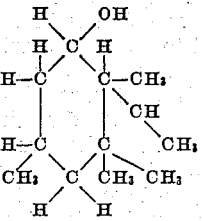

2-isopropyl-3,3,5-trimethylcyclohexanol

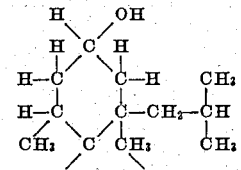

3,5-dimethyl-3-isobutylcyclohexanol

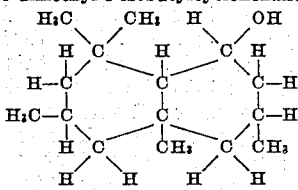

3,6,8,8,10-pentamethyl-1-hydroxydecalin

These secondary alcohols are suitable for use in the production of allophanates by the process of the present invention. If desired, they may be separated from the mixture and used individually. It is usually preferred, however, to use the mixture as such or in the form of fractions obtained by fractional distillation, for example, the fraction containing the $C_{12}$ and the $C_{15}$ alcohols. When either the entire mixture or the $C_{12}$—$C_{15}$ cut is reacted with biuret in accordance with the process of the present invention, a mixture of the corresponding allophanates is obtained. This mixture is useful as a lubricating oil addition agent since the constituents are readily oil-soluble and impart valuable properties to the lubricating oils in which they may be incorporated. Polyhydric alcohols, such as ethylene glycol, 1,2- and 1,3-propylene glycols, the butylene glycols, isobutylene glycol, glycerine, pentaerythritol, sorbitol, polyvinyl and polyallyl alcohols, and the like, have been used successfully in the process. Substituted alcohols which may be used include halogenated alcohols of which chlorethyl alcohol, 2- and 3-chloropropanol-1, etc. are typical; hydroxy ethers such as ethylene glycol monomethyl ether, diethylene glycol, diethylene glycol monoethyl ether, and the like; hydroxy esters, for example, glycol monopropionate, secondary butyl glycolate, glycerol monostearate, mannitol monooleate, glycerol monoricinoleate, etc. Still other types of substituted alcohols which have been found to be operative in the process are hydroxy ketones such as diacetone alcohol, hydroxy acetophenone, etc., and hydroxy thioethers, e. g. hydroxy ethyl methyl thioether and the like.

Although to avoid loss of the reacting material, it is preferred to use hydroxy compounds which are relatively non-volatile under the reaction conditions employed, i. e. at temperatures of from about 50° C. to about 200° C. and pressures of from about 1 mm. to about 500 mm., this is not an inflexible limitation on the process of the invention. Lower boiling reactants may be used if means are provided for recovering that portion which is volatilized in the reaction chamber and is present in the effluent gas stream. This may be done by passing the exit gases through a condenser or reflux column or by other suitable means. The process of the invention has, however, been found to be particularly well suited to the preparation of compounds of higher molecular weight such as hydroabietyl allophanate, n-octadecyl allophanate, dimethyl-ethyl-n-propylhexahydrobenzyl allophanate, etc., as is more fully described hereinbelow. Compounds of this type may be prepared from relatively non-volatile starting materials and difficulties caused by possible loss of starting materials through volatilization at low pressures are not encountered. Since many of the esters produced, especially the allophanates, impart desirable properties to lubricating oils when added thereto, in that they increase the resistance of the oil to breakdown and sludge formation under severe oxidizing conditions, reduce the corrosion of the metal-bearing surfaces with which the lubricating oils come in contact, effect reduction of wear, seizing and scuffing of the bearing surfaces, etc., it is desirable when preparing esters to be used for this purpose to introduce groups into the ester molecule which will render the ester oil-soluble. It has been found that groups of high molecular weight, particularly high molecular weight cyclic groups such as, for example, those found in hydroabietyl alcohol and dimethyl-ethyl-n-propylhexahydrobenzyl alcohol, etc., are particularly useful in producing oil-soluble compounds. Compounds of this type are therefore especially desirable for use in the presently disclosed process.

Although it is possible to prepare compounds of the type described in relatively small yields by the condensation of suitable reacting materials at atmospheric pressure or at superatmospheric pressure, operating under these conditions is impractical because of the very low yields of ester produced and because of the difficulty of separating the said ester from the unreacted starting materials as well as from the diversity of by-products formed during the course of the reaction. It has been found, for example, that when biuret is condensed with ethyl alcohol in the presence of hydrogen chloride as a condensation agent the yield of allophanate is only about 12% (Cf. J. Am. Chem. Soc., vol. 49, page 510, 1927). This low yield of product is attributed to the occurrence of side reactions such as the extensive decomposition of the biuret to form such products as ammonia, carbon dioxide, cyanuric acid and guanidine. It has been further found that when the process of the present invention is applied to the manufacture of hydroabietyl allophanate by the condensation of hydroabietyl alcohol with biuret a 46.5% conversion to hydroabietyl allophanate is formed when the condensation takes place at subatmospheric pressures, whereas but a 7.3% conversion to allaphanate is formed when the condensation is carried out at atmospheric pressure. It is therefore an essential feature of the process as carried out in accordance with the method of the present invention to effect the condensation at pressures which are below atmospheric pressure. The pressure used may be varied but may be, in general, not greater than about 250 mm. of mercury. In most cases it is desirable to keep the pressure as low as is possible or practical with the equipment and raw materials used. Wherever possible, it is preferred to employ pressures of less than 20 mm., since it has been found that when the reaction is carried out at these relatively low pressures, the product is of a superior quality in that it is relatively free from contaminating materials and has a relatively light color. By operating under reduced pressure as disclosed herein, and at room temperatures or more elevated temperatures, it is possible to remove the ammonia from the reaction mixture, thereby shifting the equilibrium and forming high yields of product.

The optimum temperatures to be used will likewise be determined by the properties of the reactants and the conditions employed in each particular case. In general, the temperature must be such as to promote the reaction without being so high as to cause the reacting materials to vaporize and thus be driven off with resultant decreased yields of ester. The temperature to be used will therefore be chiefly determined by the boiling points of the reacting substances as well as the pressure present in the system while the reaction is taking place. In general, a temperature of from about 50° C. to about 200° C. is a suitable range.

Any suitable form of equipment or apparatus may be used to carry out the reaction. It is desirable in many cases to provide means for agitating the contents of the reaction vessel by shaking, stirring, agitating with an inert gas, etc. As previously pointed out, where low boiling materials are used as reactants, it is desirable to fit the reaction vessel with a condenser or suitable reflux equipment to avoid loss of material. Suitable heating means may also be employed in order to maintain the reactants at the desired or optimum temperature. An electric heater controlled by means of a rheostat has been found to be especially suitable, although gas burners, circulating heated fluids, immersion-type heaters, or other means of supplying heat may be used if desired. Although the ammonia gas evolved may be vented to the atmosphere, it is often desirable to provide suitable apparatus for catching and recovering the ammonia gas emanating from the reaction mixture. This may be done by including a trap or suitable scrubbing or washing apparatus, containing an acid, e. g. sulfuric acid, between the reaction chamber and the evacuating pump, in order to remove the ammonia which may then be recovered from the solution in the trap in the form of an ammonia salt, e. g. ammonium sulfate. It may also be accomplished by cooling the exit gases to a temperature which is below the liquefying temperature of ammonia gas, which may then be caught and recovered as liquid ammonia.

To insure maximum conversion of the alcohol or its analogues to the corresponding ester, it is usually desirable to use an excess of the biuret-type compound in the reaction mixture. Although the amounts of the reactants used may be varied to suit the requirements of each preparation, a ratio of about three mols of biuret-type compound to about two mols of alcohol or related compound is generally a desirable and effective ratio which results in the formation of particularly high yields of product.

If desirable or necessary in any particular instance to insure thorough mixing of the reactants or to better control the progress of the reaction, a mutual solvent may be added to the reaction mixture. Suitable solvents are those in which either or both of the reacting materials are soluble at the temperature of the reaction and which will not themselves react with either or both of the said reactants. The hydrocarbon solvents such as pentane, hexane, octane, nonane, decane, benzene, toluene, xylene, etc., and their isomers, either in pure form or in mixtures with each other, are particularly suitable solvents. If desired, the lubricating oil in which the allophanate is to be incorporated as an addition agent may be used as the solvent. When this is the case, the oil may be filtered at the end of the reaction to separate the excess biuret. It is then ready for use after dilution with more oil to adjust the concentration of the additive in the lubricating oil to the proper value.

After the reaction is complete, the reaction mixture may be worked up in any desired or suitable manner to isolate the ester product. Thus, the product may be isolated and purified by distillation, extraction, fractionation, crystallization or any other suitable process. A preferred method for recovering the ester is to cool the reaction mixture and then to treat it with a solvent in which the ester is soluble to the substantial exclusion of the other components of the mixture, especially of the biuret which may be present in excess of the theoretical amount required. Any solvent which preferentially dissolves the ester and does not react with it may be used for the extraction. Suitable solvents are the hydrocarbon solvents, the ethers, the alcohols, the ketones, certain esters and the like. Toluene and the hot acid octanes have been found to be especially suitable solvents to use for isolating and purifying the ester.

The process of the invention is illustrated by the following examples in which the amounts of reactants are given in parts by weight.

*Example I*

A mixture of about 5 parts of hydroabietyl alcohol ($C_{19}H_{32}CH_2OH$) and 4 parts of biuret

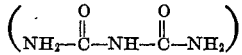

of about 90% purity contained in a suitable reaction vessel was stirred in an oil bath for 19 hours at a temperature of 140° C. to 150° C. The system was maintained at a pressure of 100 to 200 mm. and the evolved gases were pulled through a sulfuric acid trap. At the end of the reaction period the reaction product was extracted with warm hot acid octanes, after which the solvent was evaporated to separate the product. A conversion of hydroabietyl alcohol to hydroabietyl allophanate

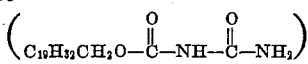

of 47% was obtained. This represents a yield of about 90% based on the amount of alcohol which had reacted. The product was isolated as a dark red, fluorescent material which was non-tacky and non-flowing at room temperature and which was soluble in hydrocarbon solvents, esters, ketones and oils.

*Example II*

To illustrate the superior yields of product obtained when operating under diminished pressure, as in the case of Example I, another experiment was carried out similar to Example I, except that the reaction was carried out under atmospheric pressure. In this case a mixture of about 3 parts of hydroabietyl alcohol and 1 part of biuret contained in a suitable reaction vessel was stirred in an oil bath at 140° C. to 150° C. for 21 hours. The system was maintained at atmospheric pressure and the ammonia evolved during the course of the reaction was allowed to escape to the atmosphere. A conversion of hydroabietyl alcohol to hydroabietyl allophanate of but 7.3% was obtained.

*Example III*

A mixture of about 20 parts biuret and 19 parts beta-(p-tertiary butylphenoxy)ethanol

was heated with stirring to a temperature of from about 140° C. to about 150° C. and a pressure of from about 100 mm. to about 200 mm. for about 20 hours in the same manner as described in Example I. Extraction of the reaction mixture with hot toluene gave a 95% yield of beta-(p-tertiary butylphenoxy)ethyl allophanate.

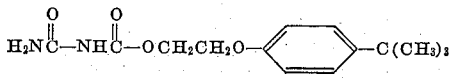

in the form of white crystals melting at 117° C. to 121° C.

*Example IV*

A mixture of about 19 parts of dimethyl-ethyl-n-propyl-hexahydrobenzyl alcohol and 20 parts of biuret of about 90% purity was stirred at a pressure of 100 to 200 mm. and a temperature of 140° C. to 150° C. for 21 hours as described in Example I. After cooling, the product was extracted with hot acid octanes and the octanes evaporated. An 89.5% conversion of alcohol to dimethyl-ethyl-n-propyl-hexahydrobenzyl allophanate was obtained. The product was an amber-colored transparent material, non-flowing and non-tacky at room temperature and soluble in ketones, esters, hydrocarbons and oils.

*Example V*

A mixture of about 2 parts of biuret of about 87.5% purity and about 5 parts of n-octadecyl alcohol $CH_3(CH_2)_{16}CH_2OH$ was stirred for 17 hours at 140° C. to 150° C. and under a pressure of 100 mm. to 200 mm. as described in Example I. Solvent extraction of the reaction mixture gave a good yield of n-octadecyl allophanate

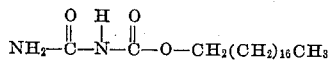

which was obtained as a pale cream-colored solid melting at 154.3° C. to 155.5° C.

*Example VI*

About 2 parts of the $C_{12}$—$C_{15}$ mixture of alcohols obtained by the fractional distillation of hydrogenated isophorone bottoms and about 1 part of biuret were heated in an oil bath with stirring at a temperature of 140° C. to 163° C. During the first 20 hours the pressure was kept at 180 mm. The pressure was then lowered to 10 mm. and heating and stirring continued for a further period of 21 hours. The product which was obtained in a 53% conversion was recovered by extraction with toluene and subsequent removal of the solvent. It was a pale, amber-colored, viscous oil, which was soluble in esters, ketones and lubricating oils.

Example VII

A mixture of about 5 parts of dithiobiuret $$NH_2-\overset{S}{\overset{\|}{C}}-\overset{H}{\overset{|}{N}}-\overset{S}{\overset{\|}{C}}-NH_2$$

and about 7 parts of hydroabietyl alcohol was stirred and heated for 45 hours at 135° C. to 150° C. and 5 to 15 mm. pressure. The reaction mixture was then extracted with toluene, the solution filtered and the solvent removed in vacuo. A small yield of dithiohydroabietyl allophanate $$H_2N-\overset{S}{\overset{\|}{C}}-\overset{H}{\overset{|}{N}}-\overset{S}{\overset{\|}{C}}-O-CH_2C_{19}H_{32}$$

was obtained. The yield can be improved by increasing the reaction temperature to about 175° C. to 185° C.

Example VIII

A mixture of about 2 parts of sulfurized oleyl alcohol $$CH_3(CH_2)_7-CH\underset{S}{\overset{}{\diagdown\diagup}}CH-(CH_2)_7-CH_2OH$$

and about 1 part of biuret was stirred for 26 hours at 144° C. to 149° C. and 15 to 40 mm. The reaction product was separated from excess biuret by extraction with toluene in which it was soluble, hot, but from which it precipitated in part on cooling to room temperature. The evaporation of the toluene gave a 61.8% conversion of the allophanate having the formula $$H_2N-\overset{O}{\overset{\|}{C}}-\overset{H}{\overset{|}{N}}-\overset{O}{\overset{\|}{C}}-O-CH_2-(CH_2)_7-CH\underset{S}{\overset{}{\diagdown\diagup}}CH-(CH_2)_7-CH_3$$

Example IX

A mixture of about 1 part of guanylurea $$NH_2-\overset{NH}{\overset{\|}{C}}-\overset{H}{\overset{|}{N}}-\overset{O}{\overset{\|}{C}}-NH_2$$

and about 2 parts of hydroabietyl alcohol was stirred and heated for 30 hours at a pressure of 1 mm. and at a temperature of 137° C. to 145° C. Extraction of the reaction mixture with toluene and removal of the toluene solvent from the product gave carbo(hydroabietoxy)-guanidine $$H_2N-\overset{NH}{\overset{\|}{C}}-NH-\overset{O}{\overset{\|}{C}}-O-CH_2-C_{19}H_{32}$$

The product was a pale amber transparent mass which was tacky and flowed at room temperature.

Example X

A mixture of 2 parts by weight of the entire range of hydrogenated isophorone bottoms (i. e. those containing $C_9$—$C_{18}$ alcohols) and of 3 parts of biuret was heated for 72 hours with stirring at a temperature of 145° C. to 155° C. The pressure was maintained at 180 to 250 mm. for the first 24 hours and then reduced to 15 to 25 mm. Extraction of the product with toluene resulted in the isolation of a 63% conversion of a mixture of the corresponding allophanates. This was a dark green viscous oil.

Example XI

A mixture of about 1 part of trimethylhexahydrobenzyl alcohol and 1 part of biuret was heated and stirred for 30 hours at 132° C. to 142° C. and 50 to 75 mm. The reaction mixture was cooled and extracted with butyl acetate, from which the trimethylhexahydrobenzyl allophanate was separated by evaporation of the solvent and further cooling. The product was a transparent, amber, resin-like solid, the analysis of which indicated it was largely trimethylhexahydrobenzyl allophanate $$H_2N-\overset{O}{\overset{\|}{C}}-NH-\overset{O}{\overset{\|}{C}}-O-CH_2-C_6H_8(CH_3)_3$$

Example XII n-Butyl alcohol was reacted with biuret at 100° C. to 106° C. and approximately 200 mm. pressure. The n-butyl allophanate thus formed was soluble in n-butyl alcohol. The butyl alcohol solution was removed from the original reaction mixture by filtration and the residual solid, largely unchanged excess biuret, was extracted with carbon tetrachloride. The combined n-butyl alcohol-carbon tetrachloride solutions were evaporated to a small volume and cooled. The solid which thus precipitated was recovered by filtration and recrystallized twice from carbon tetrachloride. This gave, in 82% conversion, a white crystalline solid which melted at 146.6° C. to 147.2° C. Mixed with a known sample of n-butyl allophanate of melting point 148° C. to 148.7° C., it melted at 147.2° C. to 148.4° C.

|  | Found | Calcd. for Allophanate $C_6H_{12}O_3N_2$ |
|---|---|---|
| Per Cent Carbon | 45.2 | 45.0 |
| Per Cent Hydrogen | 7.6 | 7.5 |
| Per Cent Nitrogen | 17.5 | 17.5 |

Example XIII

Using the same reaction conditions as in Example XII, 2,6,8-trimethylnonanol-4, prepared by condensation of methyl isobutyl ketone and hydrogenation of the dimeric condensate, was reacted with biuret, and a 93% yield of a cream-colored waxy product was obtained which, on recrystallization twice from methyl ethyl ketone, gave a white solid which melted at 127.6° C. to 130.6° C. and analyzed as follows:

|  | Found | Calcd for Allophanate $C_{14}H_{28}O_3N_2$ |
|---|---|---|
| Per Cent Carbon | 61.4(5) | 61.71 |
| Per Cent Hydrogen | 10.3(6) | 10.37 |
| Per Cent Nitrogen | 10.1(3) | 10.28 |

The data indicate that the recrystallized material is substantially pure 2,6,8-trimethylnonyl-4-allophanate.

In the same way, using ethyl alcohol at 50° C. and 150 mm. pressure, a 63% yield of ethyl allophanate melting at 197° C. to 198° C. and, using tertiary butyl alcohol, a 71% yield of tertiary butyl allophanate melting at 190° C. are obtained.

Example XIV

A mixture of guanylthiourea and dodecyl alcohol in molar proportions of about 1.2:1, reacted at about 160° C. to 168° C. and 300 mm. pressure for 29 hours with constant stirring, gave a substantial yield of carbo(dodecyl)thioguanidine $$H_2N-\overset{NH}{\overset{\|}{C}}-NH-\overset{S}{\overset{\|}{C}}-O-C_{12}H_{25}$$

The product was an amber-colored viscous mass.

value (12.8%); this was probably due to mechanically occluded biuret. When tested at 3% concentration in western lubricating oil, SAE 20 grade, in the four-ball wear machine, (sec.-butyl glycolate) allophanate gave a scar diameter of 0.29 mm. as compared with 0.70 mm. for the undoped oil.

Example XX

A mixture of 490 g. of n-butyl citrate (1.3 moles) and 210 g. of biuret (2 moles) was stirred and heated for 72 hours at 148° C.–151° C. and 5–16 mm. pressure. After isolation by means of toluene extraction, (n-butyl citrate) allophanate product appeared as a viscous liquid containing 4.5% nitrogen (71.7% allophanate); yield, 461.1 g. The following results were obtained when the product was tested in the four-ball machine for its ability to impart wear reduction qualities to western lubricating oil, SAE 20 grade:

| Concentration of (n-Butyl Citrate) Allophanate | Scar Diameter in mm. (130° C., 700 R. P. M., 7 kg. load) |
| --- | --- |
| Per Cent | |
| 0 | 0.70 |
| 1 | 0.27 |
| 3 | 0.37 |

Example XXI

Following the procedure outlined above, about 4 moles of ethylene glycol and about 12.2 moles of biuret were heated for 72 hours at 123° C. to 125° C. and 92 to 117 mm. pressure to produce a reaction product suitable as an oil additive.

Example XXII

About 6 moles of trimethylene glycol and about 18 moles of biuret were stirred and heated for about 30 hours at 125° C. to 135° C. and 42 to 96 mm. pressure. The reaction product was isolated in the manner indicated in Example XX.

Example XXIII

About 3.9 moles of 2-methyl-2,4-pentanediol and about 11.7 moles of biuret were stirred and heated for over 100 hours at between about 115° C. and 130° C. and 46 to 54 mm. pressure. The reaction product was isolated by means of methyl ethyl ketone extraction and was a viscous, greenish-red liquid containing about 12.4% nitrogen.

Example XXIV

About 2.5 moles of terpin hydrate, about 5.5 moles of biuret were stirred and heated for about 50 hours at about 140° C. to 145° C. at reduced pressure. The reaction product was isolated by toluene extraction and was a dark green viscous liquid which comprised a mixture of terpin allophanate and terpin diallophanate and some unreacted materials which, if desired, could be removed or left in the mixture when using said reaction products as oil additives.

Example XXV

About 2 moles of bis(3-hydroxyl propyl) sulfide and about 6 moles of biuret were stirred and heated for about 50 hours at 130° C. to 150° C. and 9 to 26 mm. pressure. The reaction product was extracted with methyl ethyl ketone and was a viscous, oily mass which contained about 11.6% sulfur and 15.9% nitrogen.

Example XXVI

Allyl alcohol and biuret in a mole ratio of 1:1.3 were reacted at 75° C.–80° C. and about 450 mm. pressure for 44 hours and gave, in good yield, allyl allophanate, melting point 165° C.

In the same way oleyl alcohol at 150° C. and 60 to 70 mm. gives oleyl allophanate, melting point 135° C., and under the same conditions geraniol gives geranyl allophanate, melting point 124° C.–125° C.

Example XXVII

A mixture of about 7.5 parts of thiocarbamyl urea with about 10 parts of hydroabietyl alcohol at about 140° C. to 150° C. and 10 to 15 mm. pressure gives in about 32 hours reaction time a mixture of hydroabietyl thioallophanate

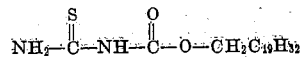

about 82%, and thio(hydroabietyl) allophanate

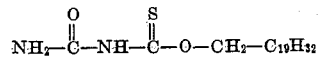

about 18% of the product.

Example XXVIII

Biuret and p-cresol in mole proportions of 1.2:1 at 130° C.–136° C. and about 150 mm. pressure give a good yield of p-tolyl allophanate, melting point 193° C.–196° C., in about 22 hours reaction time.

In the same way cinnamyl allophanate, melting point 185° C., is obtained from cinnamyl alcohol and biuret.

Example XXIX

Biuret (12.2 moles) and ethylene glycol (4 moles) were reacted for 72 hours at 123° C.–125° C. and 92–117 mm. pressure. The reaction mixture was initially a very thick slurry, but as the reaction proceeded it became a pasty mass and finally a thin slurry. The ammonia produced was absorbed in sulfuric acid and indicated substantial reaction of the ethylene glycol. The ethylene glycol mono- and di-allophanates produced were difficult to separate, but the substantially pure mono-allophanate has a melting point of about 160° C.

In the same way trimethylene glycol (6 moles) and biuret (18 moles) were stirred and heated at 129° C.–131° C. and 42–96 mm. pressure for 27 hours, and a mixture of the corresponding trimethylene glycol allophanates was obtained in good yield.

The formation of polyallophanates can be suppressed when reacting with polyhydroxy compounds by employing a substantial molecular excess of the polyhydroxy compound to biuret in the process. Thus, the yield of trimethylene glycol mono-allophanate in the foregoing example is substantially improved by the use of three moles of trimethylene glycol per mole of biuret.

Example XXX

Terpin hydrate (1-methyl-4-isopropylcyclohexane-1,4-diol) (2.5 moles) was stirred and heated with biuret (5.5 moles) for 48 hours at 140° C.–143° C. and slightly reduced pressure (approximately 300–400 mm.). The product was isolated by toluene extraction. It appeared as a dark green viscous liquid which contained 1.6(5)% nitrogen. Analysis indicated that the allophanate product was a mixture of terpin allophanate and terpin diallophanate.

Example XV

A mixture of 483.2 g. of methyl ricinoleate (1.5 moles) and 238 g. of biuret (2.3 moles) was stirred in an oil bath for 72 hours at 148° C.–151° C. The system was maintained at a pressure of 3 to 11 mm. and the evolved gases were pulled through a sulfuric acid trap. At the end of the reaction period the reaction mixture was extracted with 2 liters of hot toluene. After evaporating the solvent there was obtained 532.6 g. of product containing 4.6(8)% nitrogen and comprising approximately 66.7% (methyl ricinoleate) allophanate and 33.3% unchanged methyl ricinoleate. The excess, unreacted biuret amounted to 115 g. The yield and conversion on methyl ricinoleate were 94.6% and 59.8%, respectively, and on biuret 87.0% and 38.6%, respectively.

(Methyl ricinoleate) allophanate product was a viscous liquid which slowly crystallized to a soft oily solid. When tested in the four-ball wear machine in western lubricating oil, SAE 20 grade, it gave the following results.

| Concentration of (Methyl Ricinoleate) Allophanate | Temp. °C. | Scar Diameter in mm. (7 kg. load, 700 R. P. M.) |
|---|---|---|
| *Per Cent* | | |
| 1 | 80 | 0.23 |
| 1 | 130 | 0.22 |
| None | 130 | 0.70 |

Example XVI

The (methyl ricinoleate) allophanate of Example XV was sulfurized by reacting a mixture of 75.9 grams of (methyl ricinoleate) allophanate and 6.34 grams of flowers of sulfur while stirring and heating for 16 hours at 128° C.–139° C. The reaction mixture was extracted with methyl ethyl ketone and the solvent evaporated. This left 80.6 g. of a viscous mass which slowly gelled on standing and which contained 4.2(3)% nitrogen and 7.1(5)% sulfur. (The (methyl ricinoleate) allophanate starting material contained 4.6(8)% nitrogen and no sulfur.) When tested in the four-ball wear machine at 1% in western lubricating oil, SAE 20 grade (130° C., 7 kg. load, 700 R. P. M.), sulfurized (methyl ricinoleate) allophanate gave a scar diameter of 0.31 mm. It also increased oil stability as shown by the following results of oxygen absorption tests at 150° C. in the Shell automatic oxidation apparatus (Larsen, Thorpe, and Armfield, Ind. Eng. Chem. 34, 183 (1942)):

| Oil | Additive | Conc. of Additive | Catalyst | 1800 ml. O₂ Time in hrs. |
|---|---|---|---|---|
| | | *Per Cent* | | |
| White oil | Sulfurized (methyl ricinoleate) allophanate. | 1.4 | None | 76.4 |
| | (Methyl ricinoleate) allophanate. | 1.4 | | 1.7 |
| | None | 0 | | 1.6 |
| 120 Grade H. V. I. Aviation oil. | Sulfurized (methyl ricinoleate) allophanate. | 1.4 | 1 sq. cm. Cu per g. oil. | 78.4 |
| | None | 0 | | 11.7 |
| | Sulfurized (methyl ricinoleate) allophanate. | 1.4 | 5.5 g. Fe powder per 100 g. oil. | 82.0 |
| | None | 0 | | 34.0 |
| | Sulfurized (methyl ricinoleate) allophanate. | 1.4 | 0.5% Crankcase Catalyst No. 3-F. | 80.0 |
| | None | 0 | | 26.6 |

Tests in the thrust bearing corrosion machine indicated that sulfurized (methyl ricinoleate) allophanate imparted bearing corrosion resistance to an oil.

The same sulfurized (methyl ricinoleate) allophanate is obtained by sulfurizing methyl ricinoleate in the same way and reacting the product with biuret under the conditions used in Example XV.

Example XVII

A mixture of 933.4 g. of castor oil (1 mole) and 309 g. of biuret (3 moles) was stirred and heated for 96 hours at 155° C.–159° C. and 11–18 mm. in accordance with the procedure of Example I. After extraction by means of hot toluene (2 liters), the product appeared as a very viscous material which contained unchanged castor oil and which slowly gelled on standing. The (castor oil) allophanate product amounted to 1054.8 g. and contained 4.1(7)% nitrogen; 126.4 g. of excess, unreacted biuret was recovered. When tested in the four-ball machine for wear reduction, (castor oil) allophanate gave the following results:

| Concentration | Scar Diameter in mm. (Western lubricating oil, SAE 20 grade, 7 kg. load, 700 R. P. M., 130° C.) |
|---|---|
| *Per Cent* | |
| 1 | 0.26, 0.28 |
| 3 | 0.21, 0.24 |
| 0 | 0.70 |

Example XVIII

A mixture of 939.4 g. of hydrogenated castor oil (1 mole) and 618.0 g. of biuret (6 moles) was stirred and heated for 96 hours at 158° C.–163° C. and 13–22 mm. pressure. After isolation by means of toluene extraction, the product amounted to 1029.1 g., contained 3.6(6)% nitrogen and was similar in appearance to that obtained from castor oil. The following data were obtained in the four-ball wear machine with (hydrogenated castor oil) allophanate at 1% in western lubricating oil, SAE 20 grade:

| Temp., °C. | Scar Diameter in mm. (7 kg. load, 700 R. P. M.) |
|---|---|
| 30 | 0.34, 0.29 |
| 80 | 0.23, 0.23 |
| 130 | 0.33, 0.43 |

Example XIX

Sec.-butyl glycolate and biuret were reacted in the molar ratio of 1 to 1.5 under the following conditions: temperature, 110° C.–120° C.; pressure, 100–145 mm.; time, 75 hours. An appreciable amount of hydroxy ester was lost through volatilization. The product was isolated by methyl ethyl ketone extraction. The (sec.-butyl glycolate) allophanate contained 17.7% nitrogen, a value somewhat higher than the calculated

Example XXXI

A mixture of 459.8 g. of 2-methyl-2,4-pentanediol (3.9 moles) and 1205 g. of biuret (11.7 moles) was stirred and heated for 101 hours at 118° C.–126° C. and 46–54 mm. pressure. The mixture became more pasty with the passage of time and was reasonably fluid at the end of the reaction period. The reaction product (416 g.) was isolated by means of methyl ethyl ketone extraction. The allophanate product was a viscous, greenish-red liquid which was somewhat soluble (approximately 1%) in western lubricating oil, SAE 20 grade. It analyzed as follows:

|  | Found | Calculated For— | |
|---|---|---|---|
|  |  | Monoallophanate $C_8H_{16}O_4N_2$ | Diallophanate $C_{10}H_{18}O_6N_4$ |
| Percent Nitrogen | 12.4 | 13.7 | 19.3 |

The results of wear tests in western lubricating oil, SAE 20 grade, carried out in the four-ball machine are as follows:

| Concentration of Additive | Temp., °C. | Scar Diameter in mm. (7 kg. load, 700 R. P. M.) |
|---|---|---|
| *Percent* |  |  |
| 3 | 130 | 0.29, 0.24 |
| None | 130 | 0.70 |

Example XXXII

A mixture of 300 g. of bis-(3-hydroxypropyl) sulfide (2 moles) and 618 g. of biuret (6 moles) was stirred and heated for 48 hours at 131° C.–148° C. and 9–26 mm. pressure. The reaction was quite vigorous at first. At the end of the reaction period, the product was isolated by methyl ethyl ketone extraction. It was a viscous, oily mass (152.4 g.) which crystallized slowly on standing and which was soluble in western lubricating oil, SAE 20 grade, to the extent of approximately 0.5% to 1%. The product analyzed as follows:

|  | Found | Calcd. for Diallophanate $C_{10}H_{18}O_6N_4S$ |
|---|---|---|
| Percent Sulfur | 11.6 | 10.0 |
| Percent Nitrogen | 15.9 | 17.4 |

These analyses indicate that the product comprises the diallophanate of bis-(3-hydroxypropyl) sulfide and a small amount of bis-(3-hydroxypropyl) sulfide. When tested in western lubricating oil, SAE grade 20, in the four-ball machine for wear reduction, the allophanate of bis-(3-hydroxypropyl) sulfide gave the following results:

| Concentration of Additive | Scar Diameter in mm. (7 kg. load, 700 R. P. M., 130° C.) |
|---|---|
| *Percent* |  |
| 3 | 0.28, 0.26 |
| 1 | 0.33, 0.34 |
| 0 | 0.70 |

Example XXXIII

Valeroin (3.2 moles) and biuret (5.4 moles) react at 140° C.–148° C. under 15 to 18 mm. pressure to give a yield based on the valeroin converted of about 70% of valeroin allophanate

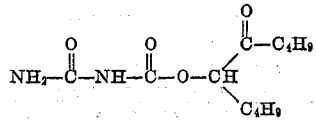

This application is a continuation-in-part of copending application of David E. Adelson and Robert G. Larsen, Serial No. 46,558, filed August 27, 1948, wherein lubricating compositions comprising allophanates which may be produced in accordance with the present invention are claimed, and is also a continuation-in-part of copending application, Serial No. 515,192, filed December 21, 1943.

I claim as my invention:

1. A process of producing an ester of the general formula

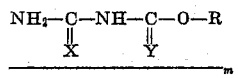

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting under subatmospheric pressure a compound of the formula

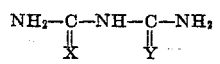

with an alcoholic hydroxy-substituted compound (R—O—H) wherein the most reactive group is hydroxyl.

2. A process of producing an ester of the general formula

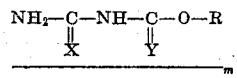

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting at a pressure less than 250 mm. of mercury a molecular excess of a compound of the formula

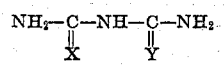

with a saturated alcoholic hydroxy-substituted compound (R—O—H) wherein the most reactive substituent is hydroxyl.

3. A process of producing an allophanate which comprises reacting under subatmospheric pressure biuret with an alcoholic hydroxy-substituted compound (R—O—H) wherein the most reactive group is hydroxyl.

4. A process of producing a dithioallophanate which comprises reacting under subatmospheric pressure dithiobiuret with an alcoholic hydroxy-substituted compound (R—O—H) wherein the most reactive group is hydroxyl.

5. A process of producing a carboguanidine which comprises reacting under subatmospheric pressure guanyl urea with an alcoholic hydroxy-substituted compound (R—O—H) wherein the most reactive group is hydroxyl.

6. A process of producing an ester of the general formula

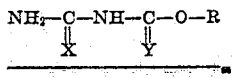

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting under subatmospheric pressure a compound of the formula

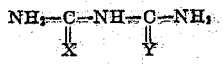

with a hydroxy-substituted hydrocarbon having 2 to 30 carbon atoms per molecule which does not polymerize under the reaction conditions.

7. A process of producing an ester of the general formula

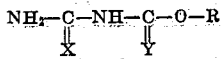

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting under subatmospheric pressure a compound of the formula

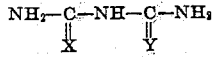

with a hydroxy-substituted compound of 2 to 30 carbon atoms per molecule wherein the most reactive substituent is hydroxyl and which contains a maximum of one multiple linkage between carbon atoms in an aliphatic chain and a maximum of two bonds in said multiple linkage.

8. A process for the production of an ester of allophanic acid which comprises reacting at subatmospheric pressure biuret with a saturated hydroxy-substituted hydrocarbon having 6 to 18 carbon atoms per molecule.

9. A process of producing a dithioallophanate which comprises reacting under subatmospheric pressure dithiobiuret with a saturated hydroxy-substituted hydrocarbon having 2 to 30 carbon atoms per molecule.

10. A process of producing a carboguanidine which comprises reacting under subatmospheric pressure guanyl urea with a saturated hydroxy-substituted hydrocarbon having 2 to 30 carbon atoms per molecule.

11. A process of producing an ester of the general formula

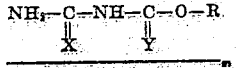

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting under subatmospheric pressure a compound of the formula

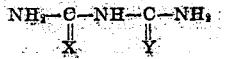

with a hydroxy ester of a carboxylic acid.

12. A process of producing an ester of the general formula

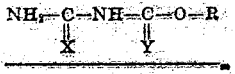

wherein X represents a divalent oxygen or sulfur radical, Y represents a divalent oxygen, sulfur or imido (=NH) radical and R—O— is a radical formed by the removal of a hydrogen atom from a hydroxyl group of an alcoholic hydroxy-substituted compound, which comprises reacting at a pressure less than 250 mm. of mercury and a temperature of 50° C. to 200° C. a molecular excess of a compound of the formula

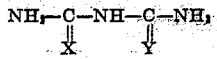

with an ester of a monohydroxy monobasic carboxylic acid.

13. A process for the production of dimethyl-ethyl - n - propylhexahydrobenzyl allophanate which comprises heating a molar excess of biuret with dimethyl-ethyl-n-propylhexahydrobenzyl alcohol at a temperature of from about 140° C. to about 150° C. and at a pressure of less than 25 mm., and extracting the reaction mixture with octane to separate the dimethyl-ethyl-n-propylhexahydrobenzyl allophanate therefrom.

14. An allophanate of a sulfurized unsaturated hydroxy compound having 8 to 20 carbon atoms per molecule.

15. An allophanate of a sulfurized monoolefinic aliphatic alcohol having 8 to 20 carbon atoms per molecule.

16. An allophanate of sulfurized oleyl alcohol.

17. An allophanate of sulfurized methyl ricinoleate.

18. An allophanate of a hydroxy compound of 2 to 30 carbon atoms per molecule having at least one sulfide sulfur linkage between two of the carbon atoms.

19. An allophanate of a sulfurized unsaturated hydroxy ester of a carboxylic acid.

DAVID E. ADELSON.

REFERENCES CITED

The following references are of record in the file of this patent:

UNITED STATES PATENTS

| Number | Name | Date |
|---|---|---|
| 2,377,909 | Van Ess | June 12, 1945 |

FOREIGN PATENTS

| Number | Country | Date |
|---|---|---|
| 211,197 | Germany | June 25, 1909 |
| 248,164 | Germany | June 13, 1912 |